United States Patent
Zhou et al.

(10) Patent No.: US 11,961,467 B2
(45) Date of Patent: Apr. 16, 2024

(54) COMPENSATION CIRCUIT, CONTROL CHIP AND DISPLAY DEVICE

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/069,429

(22) Filed: Dec. 21, 2022

(65) Prior Publication Data

US 2023/0402004 A1 Dec. 14, 2023

(30) Foreign Application Priority Data

Jun. 9, 2022 (CN) .......................... 202210645866.2

(51) Int. Cl.
*G09G 3/3225* (2016.01)

(52) U.S. Cl.
CPC ... *G09G 3/3225* (2013.01); *G09G 2300/0426* (2013.01); *G09G 2300/0842* (2013.01); *G09G 2310/0202* (2013.01); *G09G 2320/045* (2013.01)

(58) Field of Classification Search
CPC ... G09G 2300/0819; G09G 2300/0852; G09G 2300/0861
See application file for complete search history.

(56) References Cited

U.S. PATENT DOCUMENTS

| | | | |
|---|---|---|---|
| 2007/0115244 A1 | 5/2007 | Shin et al. | |
| 2017/0206839 A1* | 7/2017 | Wu | ............ G09G 3/3233 |
| 2017/0256205 A1 | 9/2017 | Zhu et al. | |
| 2021/0202679 A1* | 7/2021 | Li | ............ H10K 59/1216 |
| 2022/0319430 A1* | 10/2022 | Wang | ............ G09G 3/3258 |

FOREIGN PATENT DOCUMENTS

| | | |
|---|---|---|
| CN | 2005257804 A | 9/2005 |
| CN | 103198793 A | 7/2013 |
| CN | 106328061 A | 1/2017 |
| CN | 106504707 A | 3/2017 |
| CN | 106548753 A | 3/2017 |
| CN | 106935192 A | 7/2017 |
| CN | 109119026 A | 1/2019 |
| CN | 110827763 A | 2/2020 |

(Continued)

*Primary Examiner* — Van N Chow
(74) *Attorney, Agent, or Firm* — Maier & Maier, PLLC

(57) ABSTRACT

A compensation circuit, a control chip, and a display device are provided to solve a problem of low luminance of OLED display panels due to an existence of drifting of threshold voltage of the OLED display panels. The compensation circuit is applied to a drive circuit which includes a first TFT, a second TFT, an OLED, and a capacitance. The compensation circuit includes a third TFT and a detection circuit. A control electrode of the third TFT is configured to be connected with a second electrode of the second TFT, a first electrode of the third TFT is configured to be connected with a control electrode of the second TFT. The detection circuit is configured to be turned off and turned on respectively when receiving two continuous voltage signals output from the second electrode of the third TFT.

17 Claims, 5 Drawing Sheets

(56) References Cited

FOREIGN PATENT DOCUMENTS

| | | | |
|---|---|---|---|
| CN | 111063302 | A | 4/2020 |
| CN | 113808539 | A | 12/2021 |
| CN | 114550656 | A | 5/2022 |
| CN | 114743501 | A | 7/2022 |
| EP | 0299807 | A2 | 1/1989 |
| EP | 2876633 | A1 | 5/2015 |
| JP | S63100618 | A | 5/1988 |
| WO | 2020065947 | A1 | 4/2020 |

* cited by examiner

COMPENSATION CIRCUIT, CONTROL CHIP AND DISPLAY DEVICE

CROSS-REFERENCE TO RELATED APPLICATION

Pursuant to 35 U.S.C. § 119 and the Paris Conversion, this application claims priority to Chinese Patent Application No. 202210645866.2 filed Jun. 9, 2022, the entire contents of which are incorporated herein by reference.

TECHNICAL FIELD

The present application relates to the field of display technologies, and in particular, to a compensation circuit, a control chip and a display device.

BACKGROUND

Organic Light-Emitting Diode (OLED) devices are used as new generation of display devices, and are widely promoted due to their advantages of spontaneous luminescence and quick response, and the like. Currently, thin film transistors (TFTs) are commonly used as important electronic devices in the OLED. However, in the using process, a TFT has a problem, that is, a threshold voltage of the TFT is drifted under long-time gate electrode bias voltage, and the luminance of the OLED is determined by the voltage of the TFT. Thus, the drifting of the threshold voltage of the TFT can reduce the luminance of the OLED, thereby shortening the service life of the OLED.

SUMMARY

In order to solve the aforesaid problem, the present application provides a compensation circuit, a control chip and a display device that can solve the problem that the OLED panel has a low luminance due to the drifting of the threshold voltage of the OLED panel.

In order to achieve the aforesaid objective, in the first aspect, a compensation circuit is provided in the present application, the compensation circuit is applied to a drive circuit, the drive circuit includes a first thin film transistor (TFT), a second thin film transistor, an organic light-emitting diode (OLED) and a capacitance. A control electrode of the first thin film transistor is connected with a scanning line, a first electrode of the first thin film transistor is connected with a data line, a second electrode of the first thin film transistor is connected with a control electrode of the second thin film transistor, a second electrode of the second thin film transistor is connected with a positive pole of the organic light-emitting diode, a first electrode of the second thin film transistor is connected with a power terminal, and a negative pole of the organic light-emitting diode is grounded. One end of the capacitance is connected with the second electrode of the first TFT, and the other end of the capacitance is connected with the negative pole of the organic light-emitting diode. The compensation circuit includes a third thin film transistor and a detection circuit; a control electrode of the third thin film transistor is configured to be connected with the second electrode of the second thin film transistor, a first electrode of the third thin film transistor is configured to be connected with the control electrode of the second thin film transistor, the detection circuit is connected with the second electrode of the third thin film transistor, the scanning line and the data line respectively. The detection circuit is configured to be turned off and turned on respectively when receiving two continuous voltage signals output from the second electrode of the third thin film transistor.

Based on the compensation circuit according to the embodiments of the present application, in a processing of inputting high level signals into the drive circuit twice through the scanning line Scan, when the scanning line Scan in the drive circuit 1 receives the high-level signal for the first time, the first TFT is switched on, the data line charges the capacitance and exerts a voltage on the control electrode of the second TFT respectively, so that the second TFT is switched on. After the second TFT is switched on, the OLED is enabled to emit light. Moreover, the second electrode of the second TFT exerts a voltage VDD on the control electrode of the third TFT to enable the third TFT to be switched on. At this time, the first electrode of the third TFT collects a gate voltage Vth of the control electrode of the second TFT, and transmits the gate voltage Vth to the detection circuit through the second electrode of the third TFT. The detection circuit 201 is turned on after receiving the gate voltage Vth and transmits the gate voltage Vth to the data line.

When the scanning line in the drive circuit receives the low level signal for the first time, the first TFT is switched off, and the capacitance supplies voltage to the control electrode of the second TFT by discharging, so that the second TFT is kept at a switched on state, and the luminance of the OLED is maintained accordingly.

Then, when the scanning line Scan in the drive circuit receives the high level signal for the second time, the first TFT is switched on, the data line charges the data voltage Vdata and the gate voltage Vth into the capacitance, and exerts a voltage on the control electrode of the second TFT to enable the second TFT to be switched on. Moreover, the second electrode of the second TFT may exert a voltage on the control electrode of the third TFT to enable the third TFT to be switched on. At this time, the first electrode of the third TFT collects the gate voltage Vth of the control electrode of the second TFT, and transmits the gate voltage Vth to the detection circuit through the second electrode of the third TFT. After receiving the gate electrode Vth, the detection circuit is turned off and does not exert voltage on the data line.

When the scanning line Scan receives the low level signal for the second time, the first TFT is turned off, the capacitance is discharged, since the data voltage and the compensated threshold voltage are stored in the capacitance, in this condition, the second TFT can also enable the OLED to provide excellent luminance at the high level signal under the low level signal, so that the luminance of the OLED is ensured. In this way, in the condition of switching between the high level signal and the low level signal, the problem of reduction of luminance of OLED due to the drifting of the threshold voltage under long-time gate electrode bias voltage is solved.

It can be understood that, when the scanning line input the high level signal to the drive circuit, one time of compensation of threshold voltage can be accomplished through two times of signal input.

Furthermore, the detection circuit includes a resistor, a T flip-flop, and a fourth TFT. One end of the resistor is connected with a clock signal receiving terminal of the T flip-flop, the other end of the resistor is connected with the scanning line. A non-inverting signal output of the T flip-flop is connected with a control electrode of the fourth thin film transistor, a second electrode of the fourth thin film transistor is connected with the second electrode of the third thin film transistor, and a first electrode of the fourth thin film transistor is connected with the data line.

Furthermore, the T flip-flop is a falling edge T flip-flop.

Furthermore, the compensation circuit further includes a voltage follower connected in series between the third thin film transistor and the detection circuit, where a non-inverting input of the voltage follower is connected with the second electrode of the third thin film transistor, and an output of the voltage follower is connected with the detection circuit and an inverting input of the voltage follower, respectively.

Furthermore, the compensation circuit further includes a first control subcircuit and a second control subcircuit, the first control subcircuit is respectively connected with the second electrode of the second thin film transistor and the second control subcircuit. The first control subcircuit is configured to control the second control subcircuit to output a high-level signal and a low-level signal alternatively according to a signal output by the second electrode of the second thin-film transistor. The second control subcircuit is configured to input the high-level signal and the low-level signal to the scanning line alternatively.

According to the compensation circuit of the present application, the first control module can directly control the second control module to output the high level signal and the low level signal alternatively, there is no need to additionally add pull-up resistors and pull-down resistors for respectively controlling the conversion of high level and low level, as compared to the conversion of high level and low level implemented by adding pull-up resistors and pull-down resistors in the prior art.

Furthermore, the first control subcircuit includes a comparator, a data flip-flop, an inverter, a first metal oxide semiconductor field effect transistor (MOSFET) and a second metal oxide semiconductor field effect transistor. A non-inverting input of the comparator is connected with the second electrode of the second thin film transistor, an inverting input of the comparator is grounded, an output of the comparator is connected with the control electrode of the third thin film transistor. A clock signal receiving terminal of the D flip-flop is connected with the output of the comparator, a data signal input of the D flip-flop is connected with an output of the inverter, a non-inverting signal output of the D flip-flop is connected with an input of the inverter, a control electrode of the first metal oxide semiconductor field effect transistor, and a control electrode of the second metal oxide semiconductor field effect transistor respectively. A second electrode of the first metal oxide semiconductor field effect transistor and a second electrode of the second metal oxide semiconductor field effect transistor are connected with the second control subcircuit, respectively.

Furthermore, the comparator is a zero-crossing voltage comparator.

Furthermore, the data flip-flop is a rising edge data flip-flop.

In the second aspect, a control chip is provided in the embodiments of the present application, the control chip is connected with a scanning line in a display panel and is configured to input a scanning signal to the scanning line. The control chip includes the compensation circuit described in the first aspect.

In the third aspect, a display device is provided in the embodiments of the present application, the display device includes the control chip described in the second aspect.

The circuit configuration of the compensation circuit of the present application and other objectives and beneficial effects of the present application will be described in detail with reference to the accompanying drawings so as to ensure that the description of the preferable embodiments are more apparent and more understandable.

BRIEF DESCRIPTION OF THE DRAWINGS

In order to describe the technical solutions in the embodiments of the present application or the existing technology more clearly, a brief introduction regarding the accompanying drawings that need to be used for describing the embodiments of the present application or the existing technology is given below. It is apparent that the accompanying drawings described below are merely some embodiments of the present application, a person of ordinary skill in the art may also acquire other drawings according to the current drawings without paying creative labor.

DETAILED DESCRIPTION OF THE EMBODIMENTS

In the following descriptions, in order to describe but not intended to limit the present application, concrete details including specific system structure and technique are proposed, so that a comprehensive understanding of the embodiments of the present application is facilitated. However, a person of ordinarily skill in the art should understand that, the present application can also be implemented in some other embodiments from which these concrete details are excluded. In other conditions, detailed explanations of method, circuit, device and system well known to the public are omitted, so that unnecessary details which are disadvantageous to understanding of the description of the present application may be avoided.

Figure 1:
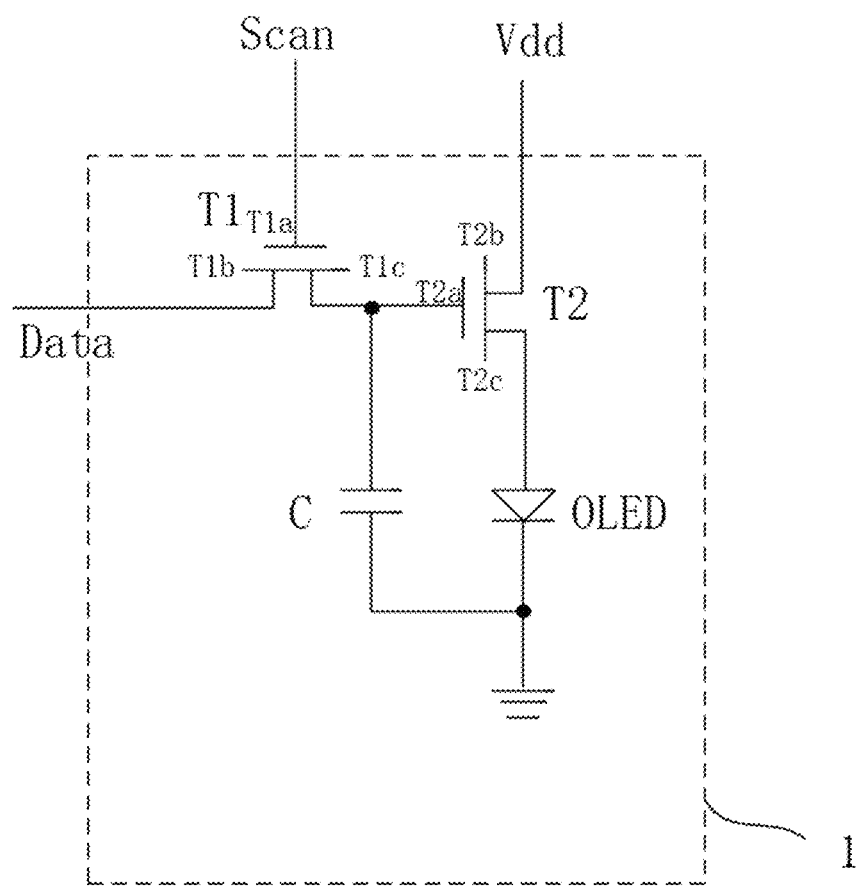
FIG. 1 illustrates a schematic circuit configuration of a drive circuit according to one embodiment of the present application.

A drive circuit with a model of 2T1C is often used to control an organic light-emitting diode (Organic Light-emitting Diode, OLED) to emit light in an OLED panel. The drive circuit with the model of 2T1C generally includes two thin film transistors (Thin Film Transistors, TFTs), a capacitance, and an OLED. For example, as shown in FIG. 1, the drive circuit 1 may include a first TFT T1, a second TFT T2, an OLED and a capacitance C. A control electrode T1*a* of the first TFT T1 is connected with a scanning line Scan, a first electrode T1*b* of the first TFT T1 is connected with a data line Data, a second electrode T1*c* of the first TFT T1 is connected with a control electrode T2*a* of the second TFT T2, a second electrode T2c of the second TFT T2 is connected with a positive pole of the OLED, a first electrode T2b of the second TFT T2 is connected with a terminal VDD (i.e., a power terminal), and a negative pole of the OLED is grounded. One end of the capacitance C is connected with the second electrode T1c of the first TFT T2, and the other end of the capacitance C is connected with the negative pole of the OLED.

When the scanning line Scan in the drive circuit 1 receives a high-level signal for the first time, the first TFT T1 is turned on, and the data line Data may charge the capacitance C and exert a voltage on the control electrode T2a of the second TFT T2. After the control electrode T2a of the second TFT T2 receives the voltage of the data line Data, the second TFT T2 is turned on, and the second electrode T2 of the second TFT T2 exerts a voltage on a positive pole of the OLED to enable the OLED to emit light.

When the scanning line Scan receives a low level signal for the first time, the first TFT T1 is turned off, the data line Data cannot exert a voltage on the control electrode T2a of the second TFT T2. At this time, the capacitance C discharges, and the capacitance C supplies a voltage to the control electrode T2a of the second TFT T2 (to keep the second TFT T2 to be switched on), such that the OLED can emit light.

Due to the fact that the threshold voltage of the TFT is drifted under a long-time bias voltage of gate electrode, however, when the capacitance is discharged, the voltage exerted on the control electrode T2a of the second TFT T2 may be lower than the drifted threshold voltage, the luminance of the OLED is reduced, and the display effect of the OLED is further affected.

It should be understood that, the circuit configuration of the drive circuit 1 is not limited in the present application, as long as the drive circuit 1 includes the first TFT, the second TFT, the OLED, and the capacitance. For example, the drive circuit 1 is a p-type circuit (i.e., consisting of two TFTs and one capacitance) having a model of 2T1C.

Figure 2:
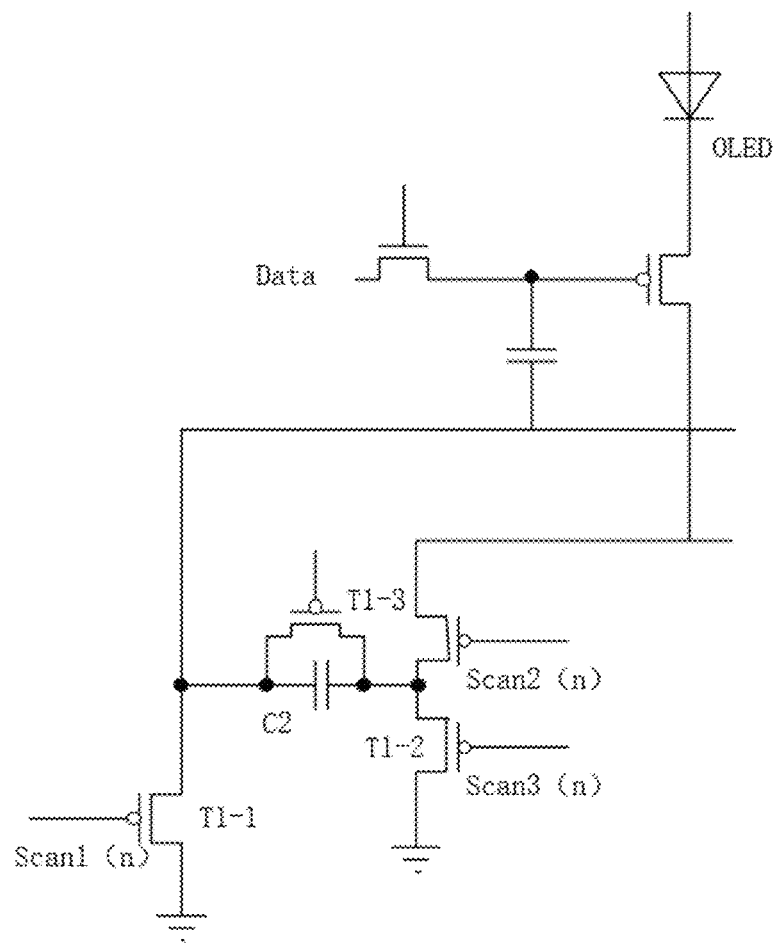
FIG. 2 illustrates a schematic circuit configuration of a compensation circuit in the prior art.

In the prior art, a technical solution is existed, that is, a compensation circuit 2 connected with the drive circuit 1 is provided in the display panel. As shown in FIG. 2, this compensation circuit 2 includes a first TFT T1-1, a second TFT T1-2, a third TFT T1-3, and a capacitance C2. A control electrode of the first TFT T1-1, a second TFT T1-2, and a third TFT T1-3 are respectively connected with a first scanning line Scan 1(n), a second scanning line Scan 2(n) and a third scanning line Scan 3(n). A first electrode of the first TFT T1-1 is grounded, a second electrode of the first TFT T1-1 is connected with one end of the capacitance C2, a first electrode of the third TFT T1-3 is grounded, a second electrode of the third TFT T1-3 is connected with the other end of the capacitance C2. A first electrode of the second TFT T1-2 is connected with an internal drive circuit 1, and a second electrode of the second TFT T1-2 is connected with the other end of the capacitance C2. When the scanning line receives the high level signal, the capacitance C1 and the capacitance C2 are charged. When the scanning line receives a low level, the capacitance C2 performs voltage compensation on the capacitance C1 to avoid the threshold voltage from being drifted, which affects the luminescence of the OLED. In this way, a plurality of transistors, scanning lines, and capacitances need to be arranged on the display panel. It can be seen from the FIG. 2 that, the circuit configuration is complex, the circuit arrangement of the display panel is greatly increased, so that an area of one single OLED is increased, and thus the OLED is not attractive in appearance.

In view of this, a compensation circuit 2 is provided in the present application, the compensation circuit 2 is applied to the drive circuit 1 and may be arranged on a peripheral chip, the circuit configuration is simple, and the problem that the OLED panel has a low luminance due to the drifting of threshold voltage of the OLED panel is solved.

The compensation circuit 2 provided in the present application is described with reference to the accompanying drawings.

Figure 3:
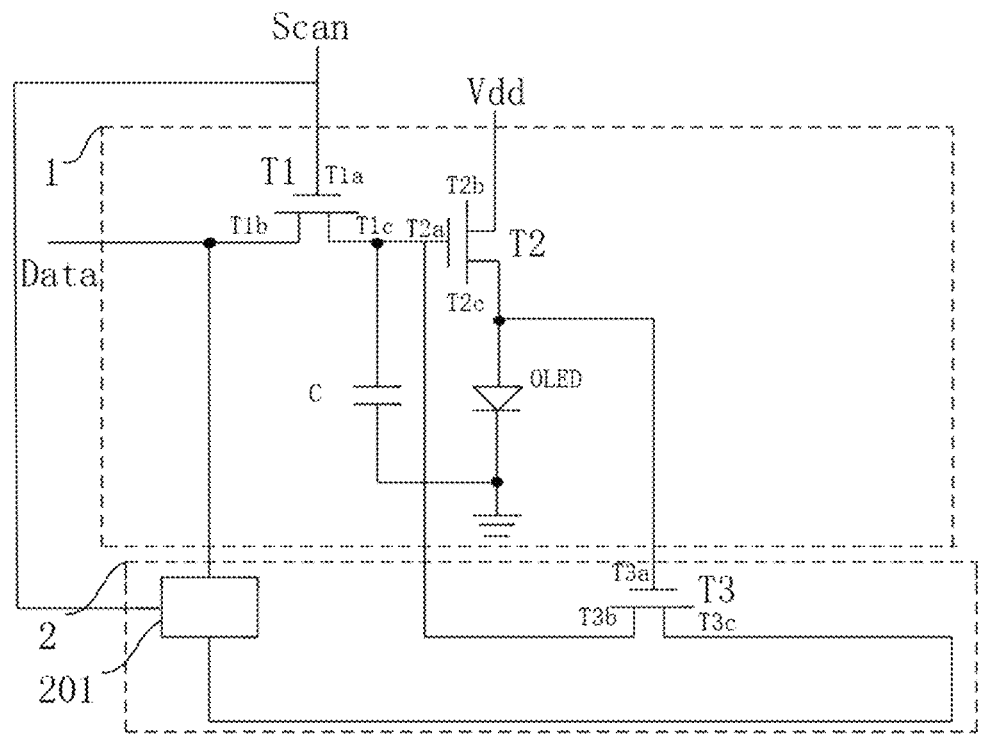
FIG. 3 is a first schematic circuit configuration of a compensation circuit according to one embodiment of the present application.

The drive circuit 1 shown in FIG. 1 is taken as an example, based on FIG. 1, as shown in FIG. 3, the compensation circuit 2 includes a third TFT T3 and a detection circuit 201, a control electrode T3a of the third TFT T3 is configured to be connected with the second electrode T2c of the second TFT T2, a first electrode T3b of the third TFT T3 is configured to be connected with the control electrode T2a of the second TFT T2, the detection circuit 201 is connected with the second electrode T3c and the data line Data of the third TFT T3, respectively. The detection circuit 201 is configured to be turned off and turned on respectively when receiving two continuous voltage signals.

When the scanning line Scan in the drive circuit 1 receives the high-level signal for the first time, the first TFT T1 is switched on, the data line Data charges the capacitance C and exerts a voltage on the control electrode T2a of the second TFT T2 respectively, so that the second TFT T2 is switched on. After the second TFT T2 is switched on, the OLED is enabled to emit light. Moreover, the second electrode T2c of the second TFT T2 exerts a voltage (i.e., VDD) on the control electrode T3a of the third TFT T3 to enable the third TFT T3 to be switched on. At this time, the first electrode T3b of the third TFT T3 collects a gate voltage Vth of the control electrode T2a of the second TFT T2, and transmits the gate voltage Vth to the detection circuit 201 through the second electrode T3c of the third TFT T3. The detection circuit 201 is turned on after receiving the gate voltage Vth and transmits the gate voltage Vth to the data line Data.

When the scanning line Scan in the drive circuit 1 receives the low level signal for the first time, the first TFT T1 is switched off, and the capacitance C supplies voltage to the control electrode T2a of the second TFT T2 by discharging, so that the second TFT T2 is kept at a switched on state, and the luminance of the OLED is maintained accordingly.

Then, when the scanning line Scan in the drive circuit 1 receives the high level signal for the second time, the first TFT T1 is switched on, the data line Data charges the data voltage Vdata and the gate voltage Vth into the capacitance C, and exerts a voltage on the control electrode T2a of the second TFT T2, so that the second TFT T2 is switched on. Moreover, the second electrode T2c of the second TFT T2 may exert a voltage on the control electrode T3a of the third TFT to enable the third TFT to be switched on. At this time, the first electrode T3b of the third TFT T3 collects the gate voltage Vth of the control electrode T2a of the second TFT T2, and transmits the gate voltage Vth to the detection circuit 201 through the second electrode T3c of the third TFT T3. After receiving the gate electrode Vth, the detection circuit 201 is turned off and does not exert voltage on the data line Data.

When the scanning line Scan receives the low level signal for the second time, the first TFT T1 is turned off, the capacitance C is discharged, since the data voltage and the gate voltage Vth for compensating the data voltage Vdata is stored in the capacitance C, such that the second TFT T2 can also enable the OLED to provide excellent luminance at the high level signal under the low level signal, the luminance of the OLED is ensured accordingly. In this way, in the condition of switching between the high level signal and the low level signal, a problem of drifting of the threshold voltage caused due to long-time gate electrode bias voltage is solved, and the luminance of the OLED is ensured under the low-level signal.

When the scanning line Scan receives the third high-level signal, the detection circuit 201 is turned on and outputs the threshold voltage to the data line Data. When receiving two continuous high-level signals, the detection circuit 201 is turned off and turned on, respectively, and this process is repeatedly performed.

Figure 4:
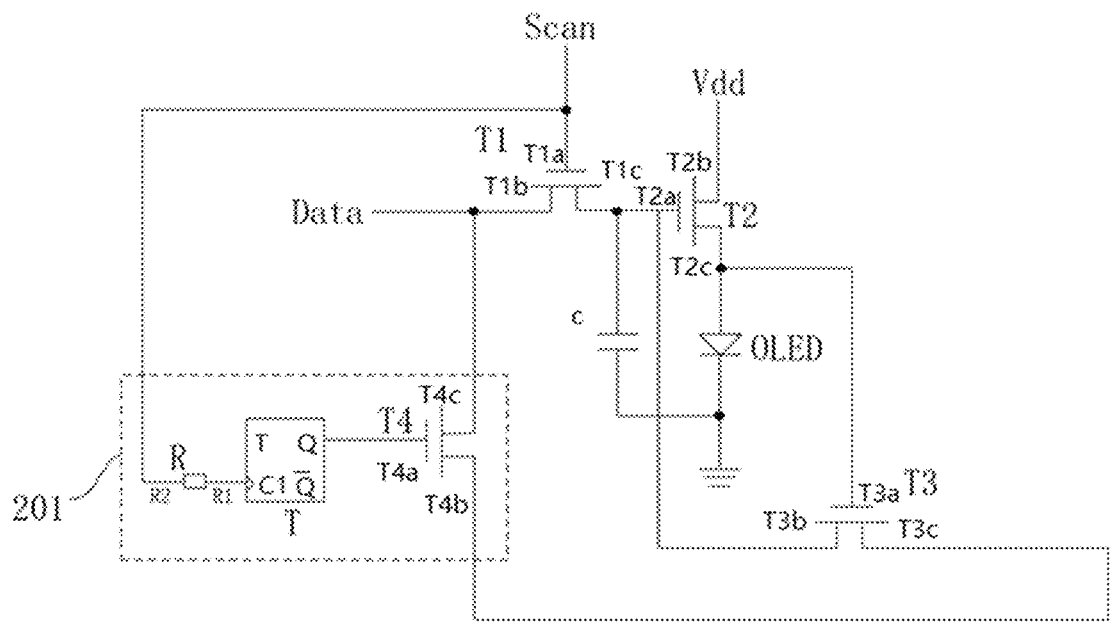
FIG. 4 is a second schematic circuit configuration of the compensation circuit according to one embodiment of the present application.

In one example, in the present application, the detection circuit 201 may be detected based on a T flip-flop. For example, as shown in FIG. 4, the detection circuit 201 may include a resistor R, a T flip-flop, and a fourth TFT T4. One end of the resistor C (i.e., the end R1 shown in FIG. 4) is connected with a clock signal receiving terminal (i.e., the end C1 as shown in FIG. 4), the other end (i.e., the end R2 as shown in FIG. 4) of the resistor C is connected with the scanning line Scan, a second data signal input (i.e., the terminal T as shown in FIG. 4) of the T flip-flop is configured to output a digital signal. When a digital signal "0" is received at the second data signal input, a non-inverting output (i.e., the terminal Q as shown in FIG. 4) of the T flip-flop outputs a low level signal. When a digital signal "1" is received at the second data signal input, the terminal Q of the T flip-flop outputs a high level signal. The terminal Q of the T flip-flop is connected with a control electrode T4a of the fourth TFT T4, a second electrode T4b of the fourth TFT T4 is connected with the second electrode T3c of the third TFT T3, and the first electrode T4c of the fourth TFT T4 is connected with the data line Data.

As an example, the T flip-flop may be a falling edge T flip-flop, and a T-terminal of the falling edge T flip-flop in this embodiment of the present application is always at a high level. When a C1 end of the T flip-flop detects two continuous falling edge signals, the T flip-flop is turned off and turned on respectively, so that the fourth TFT T4 is turned off and turned on correspondingly.

For example, when the scanning line Scan receives the high-level signal for the first time, the detection circuit 201 receives the high-level signal (i.e., the clock control signal) output by the scanning line Scan. When the digital signal "1" is received at the T terminal, the falling edge T flip-flop outputs a high level to enable the fourth TFT T4 to be switched on, so that the detection circuit 201 outputs the gate voltage Vth to the data line Data.

When the scanning line Scan in the drive circuit 1 receives the low level signal for the first time, the first TFT T1 is turned off, and the capacitance C supplies electricity to the control electrode T2a of the second TFT T2 to enable the OLED to emit light.

When the scanning line Scan in the drive circuit 1 receives the high-level signal for the second time, the terminal C1 of the T flip-flop receives the clock control signal. When the digital signal "1" is received at the terminal T, the terminal Q of the falling edge T flip-flop output a low level signal. After the control electrode T4a of the fourth TFT receives the low level signal, the fourth TFT T4 is turned off, such that the first electrode T4b of the fourth TFT T4 cannot output voltage to the data line Data. Thus, the detection circuit 201 can turn off and turn on the fourth TFT T4 respectively when receiving two continuous high-level signals, thereby controlling the compensated gate voltage Vth.

If not, when the scanning line Scan frequently receives high-level signals, the compensation circuit 2 always exerts a gate voltage Vth on the data line Data, so that the compensated gate voltage Vth is always increasing. Finally, a fault of the OLED panel is caused.

It can be understood that when the threshold voltage changes due to the change of the external environment, the gate voltage Vth detected in the present application is also changed.

Figure 5:
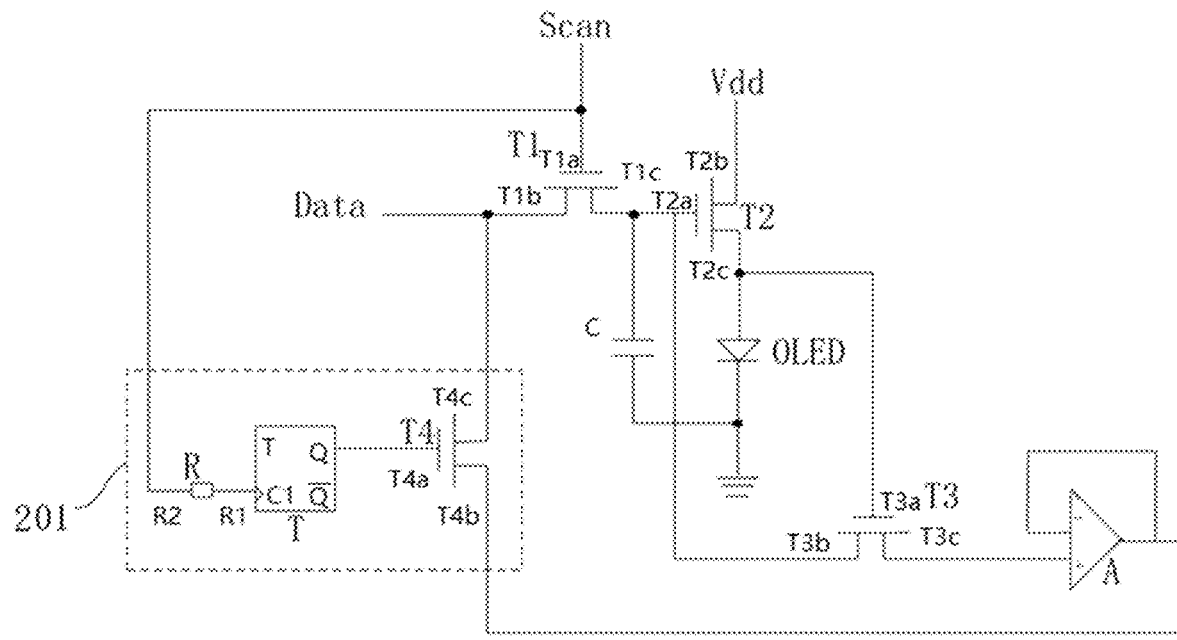
FIG. 5 is a third schematic circuit configuration of the compensation circuit according to one embodiment of the present application.

In one example, as shown in FIG. 5, the compensation circuit 2 may further include a voltage follower (i.e., the circuit component A shown in FIG. 5), the voltage follower is connected in series between the third TFT T3 and the detection circuit 201, a non-inverting input of the voltage follower A (i.e., the terminal "+" of the voltage follower A in FIG. 5) is connected with a second electrode T3c of the third TFT T3, an output of the voltage follower A is respectively connected with the detection circuit 201 and an inverting input of the voltage follower (i.e., the terminal "−" of the voltage follower A in FIG. 5). The voltage follower A is arranged in the compensation circuit 2, so that a load capacity of the compensation circuit 2 can be improved, and a problem of loss of gate voltage in a transmission process is alleviated.

Figure 6:
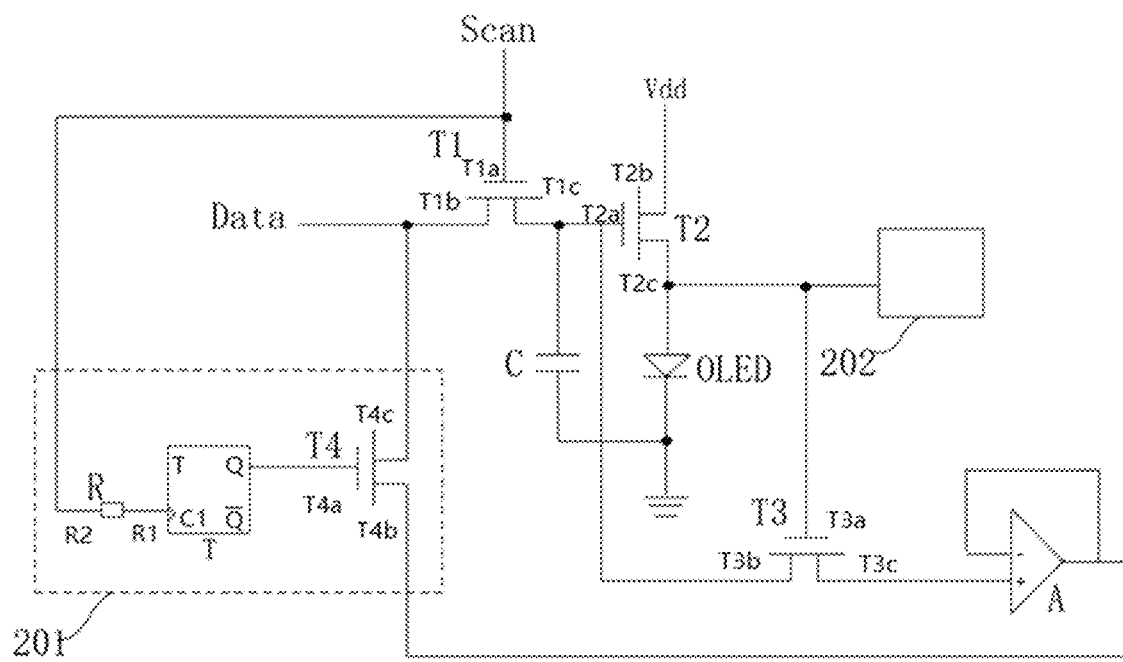
FIG. 6 is a fourth schematic circuit configuration of the compensation circuit according to one embodiment of the present application.

In one example, as shown in FIG. 6, the compensation circuit 2 further includes a first control subcircuit 202, the first control subcircuit 202 is connected with the second electrode T2c of the second TFT T2 and the second control subcircuit, respectively, and the first control subcircuit 202 is configured to control the second control subcircuit to output a high level signal and a low level signal alternately according to a signal output by the second electrode T2c of the second TFT T2. The second control subcircuit is configured to input the high level signal and the low level signal to the scanning line Scan alternately. In this way, it is unnecessary to additionally arrange pull-up resistors and pull-down resistors for respectively controlling the conversion of the high level signal and low level signal. The conversion of the high level signal and the low level signal can be realized through one single control subcircuit 202.

Figure 7:
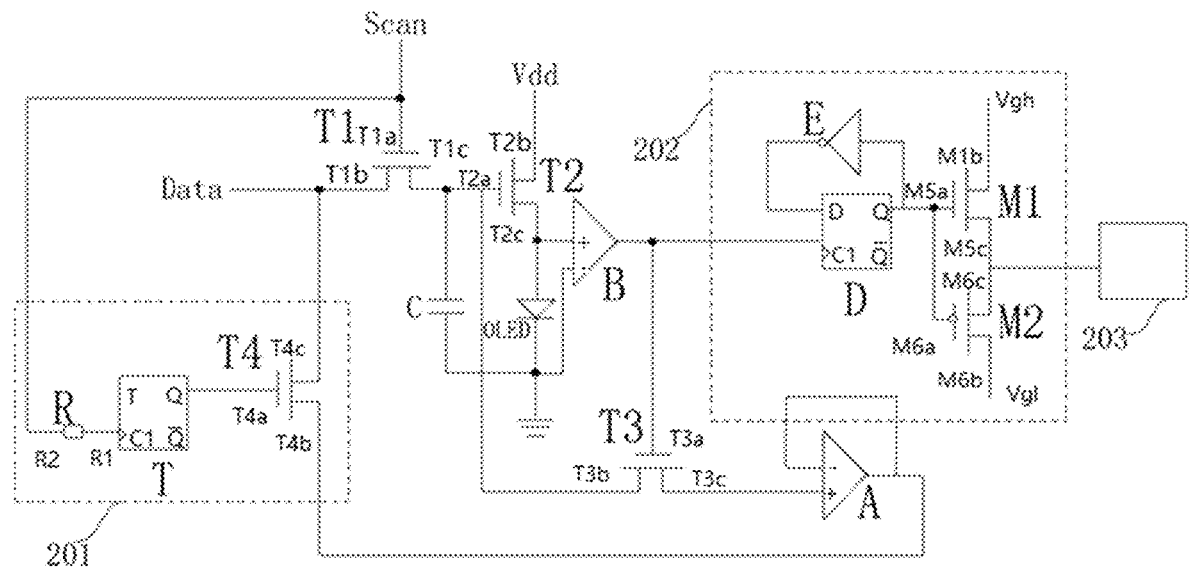
FIG. 7 is a fifth schematic circuit configuration of the compensation circuit according to one embodiment of the present application.

For example, the first control subcircuit 202 may include a comparator shown in FIG. 7 (i.e., the circuit component B shown in FIG. 7), a D flip-flop, an inverter (i.e., the circuit component E shown in FIG. 5), a first metal oxide semiconductor field effect transistor (Metal Oxide Semiconductor Field Effect Transistor, MOSFET) M1 and a second MOSFET M2. A non-inverting input of the comparator B is connected with the second electrode T2c of the second TFT T2, an inverting input (the terminal "−" of the circuit component B shown in FIG. 7) is grounded, an output of the comparator B is connected with the control electrode T3a of the third TFT T3. A clock signal receiving terminal (the terminal C1 shown in FIG. 7) of the D flip-flop is connected with an output of the comparator B, a data signal input (i.e., the terminal D shown in FIG. 7) of the D flip-flop is connected with an output of the inverter E, a non-inverting signal output (i.e., the terminal Q shown in FIG. 7) of the D flip-flop is connected with the input of the inverter E, a control electrode M1a of the first MOSFET M1 and a control electrode M2a of the second MOSFET M2, respectively. A second electrode M1c of the first MOSFET M1 and a second electrode M2c of the second MOSFET M2 are connected with the second control subcircuit respectively.

In some embodiments, the comparator B may be a zero-crossing voltage comparator.

In some embodiments, the D flip-flop may be a rising edge D flip-flop.

For example, when the scanning line Scan receives the high level signal for the first time, the first TFT T1 is switched on, and the data line Data charges the capacitance C and exerts a voltage on the control electrode T2a of the second TFT T2 respectively, so that the second TFT T2 is switched on. After the second TFT T2 is switched on, the OLED is enabled to emit light. Moreover, the second electrode T2c of the second TFT T2 exerts a voltage on the non-inverting input (+) of the comparator B, at this time, this voltage is greater than the voltage when the inverting input (−) of the comparator B is grounded, the output of the comparator B outputs a high level, and the comparator B exerts a voltage on the control electrode T3a of the third TFT T3 to enable the third TFT T3 to be switched on. After the signal output from the output of the comparator B is received at the clock signal receiving terminal of the D flip-flop, the data signal input of the D flip-flop is at a high level, such that the non-inverting signal output of the D flip-flop is enabled to output a high level signal. When the inverting signal output of the D flip-flop outputs a high level signal, the high level signal is received at the control terminal M1a of the first MOSFET, the first MOSFET is switched on, the second MOSFET is switched off, so that the first MOSFET M1 output a high level signal to the second control subcircuit 203, and the second control subcircuit 203 is enabled to output a high level signal to the scanning line Scan. However, since the data signal input of the D flip-flop is connected with the output of the inverter E, and the non-inverting signal output of the D flip-flop is connected with the input of the inverter E, the control electrode M1a of the first MOSFET M1 and the control electrode M2a of the second MOSFET M2, respectively. Thus, after the non-inverting signal output of the D flip-flop outputs a high level signal, the high level enables a digital signal "0" to be input to the data signal input of the D flip-flop through the inverter E, so that the non-inverting signal output of the D flip-flop outputs a low level signal, the high level signal is received at the control electrode M2a of the second MOSFET M2, the second MOSFET M2 is switched on, the first MOSFET M1 is turned off. Thus, the second MOSFET M2 is enabled to output a low level signal to the second control subcircuit 203 to control the scanning line Scan. Therefore, the D flip-flop can be always kept in a switching mode of receiving a data signal "0" and a data signal "1", thereby achieving the conversion of high level and low level through one signal first control subcircuit 202.

In one example, in order to avoid variations of circuit characteristics due to the variations of the transistors, the first TFT T1, the second TFT T2, the third TFT T3, and the fourth TFT T4 provided in this embodiment of the present application may be the same transistor.

Exemplarily, an oxide thin-film transistor (Oxide Thin Film Transistor, Oxide TFT) may be selected. The Oxide TFT is provided with high carrier mobility, low preparation temperature and good electricity homogeneity.

Second Embodiment

A control chip is further provided in the second embodiment of the present application. The control chip is connected with the scanning lines of the display panel and is configured to input scanning signals to the scanning lines, and the control chip includes a compensation circuit 2 provided in the first embodiment.

Where, the control chip may be provided with one compensation circuit 2, and the first electrode T3b of the third TFT T3 in the compensation circuit 2 is respectively connected with the control electrodes T2a of the second TFTs T2 of the drive circuits 1 corresponding to the plurality of OLEDs in the display panel, thereby performing a threshold voltage compensation on the display panel entirely.

Figure 8:
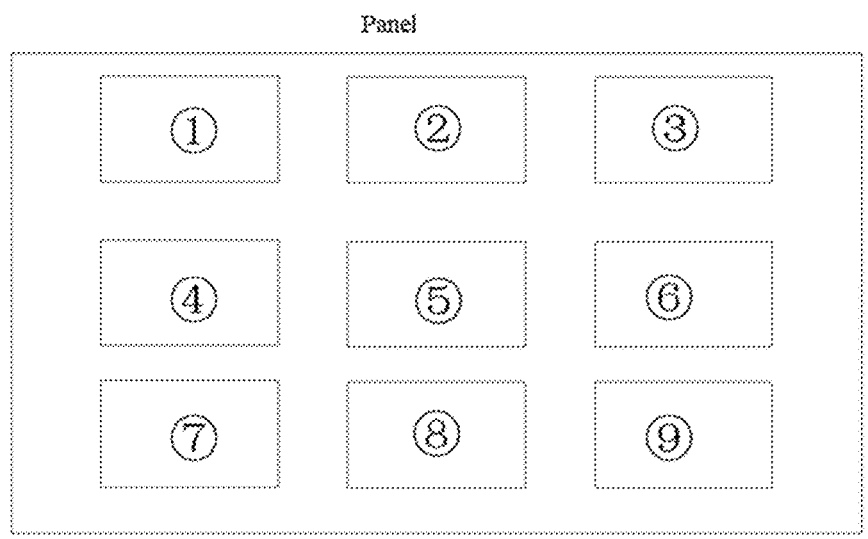
FIG. 8 is a schematic structural diagram of a display panel according to one embodiment of the present application.

In some embodiments, the control chip may be provided with a plurality of compensation circuits 2, and each of the plurality of compensation circuits 2 corresponds to one display area of the display panel. For example, as shown in FIG. 8, the display panel is divided into 9 display areas, the control chip may be provided with 9 compensation circuits 2, and the first electrodes T3b of the third TFTs T3 of the 9 compensation circuits 2 are respectively connected with the control electrodes T2a of the second TFTs T2 of the drive circuits 1 corresponding to the plurality of OLEDs in the 9 display areas, thereby performing the threshold voltage compensation on the corresponding display areas.

In some embodiments, compensation circuits 2 of the drive circuits 1 corresponding to the plurality of OLEDs in the display panel may also be designed in the control chip, that is, each of the plurality of OLEDs is divided into one display area.

It can be understood that, the more the number of display areas that the display panel are divided into, the more fine the compensation of the gate voltage Vth for each of the display areas is, and the better the display effect of the OLED panel is. The detail of compensation mode may be determined according to the actual requirement.

Third Embodiment

Based on the control chip, a display device is further provided in the third embodiment of the present application. The display device includes the control chip provided in the second embodiment.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

Moreover, in the description of the specification and the annexed claims of the present application, terms such as "first" and "second", "third", etc., are only intended to be distinguished in description, but shouldn't be interpreted as indicating or implying a relative importance.

The descriptions of "referring to one embodiment" and "referring to some embodiments", and the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise a special emphasis is provided in other manner. The terms "comprising", "including", "having" and their variations mean "including but is not limited to", unless there is a special emphasis in other manner otherwise.

The aforesaid embodiments are only intended to explain but not to limit the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A compensation circuit, applied to a drive circuit, the drive circuit comprises a first thin film transistor (TFT), a second thin film transistor, an organic light-emitting diode (OLED) and a capacitance; wherein a control electrode of the first thin film transistor is connected with a scanning line, a first electrode of the first thin film transistor is connected with a data line, a second electrode of the first thin film transistor is connected with a control electrode of the second thin film transistor, a second electrode of the second thin film transistor is connected with a positive pole of the organic light-emitting diode, a first electrode of the second thin film transistor is connected with a power terminal, and a negative pole of the organic light-emitting diode is grounded; one end of the capacitance is connected with the second electrode of the first TFT, and the other end of the capacitance is connected with the negative pole of the organic light-emitting diode; wherein the compensation circuit comprises a third thin film transistor and a detection circuit; and
  a control electrode of the third thin film transistor is configured to be connected with the second electrode of the second thin film transistor, a first electrode of the third thin film transistor is configured to be connected with the control electrode of the second thin film transistor, the detection circuit is connected with the second electrode of the third thin film transistor, the scanning line and the data line respectively; and the detection circuit is configured to be turned off and turned on respectively when receiving two continuous voltage signals output from the second electrode of the third thin film transistor.

2. The compensation circuit according to claim 1, wherein the detection circuit comprises a resistor, a T flip-flop, and a fourth TFT; and
  one end of the resistor is connected with a clock signal receiving terminal of the T flip-flop, the other end of the resistor is connected with the scanning line, a non-inverting signal output of the T flip-flop is connected with a control electrode of the fourth thin film transistor, a second electrode of the fourth thin film transistor is connected with the second electrode of the third thin film transistor, and a first electrode of the fourth thin film transistor is connected with the data line.

3. The compensation circuit according to claim 2, wherein the T flip-flop is a falling edge T flip-flop.

4. The compensation circuit according to claim 1, further comprising a voltage follower connected in series between the third thin film transistor and the detection circuit, wherein a non-inverting input of the voltage follower is connected with the second electrode of the third thin film transistor, and an output of the voltage follower is connected with the detection circuit and an inverting input of the voltage follower, respectively.

5. The compensation circuit according to claim 1, further comprising a first control subcircuit and a second control subcircuit, the first control subcircuit is respectively connected with the second electrode of the second thin film transistor and the second control subcircuit, the first control subcircuit is configured to control the second control subcircuit to output a high-level signal and a low-level signal alternatively according to a signal output by the second electrode of the second thin-film transistor, the second control subcircuit is configured to input the high-level signal and the low-level signal to the scanning line alternatively.

6. The compensation circuit according to claim 5, wherein the first control subcircuit comprises a comparator, a data flip-flop, an inverter, a first metal oxide semiconductor field effect transistor (MOSFET) and a second metal oxide semiconductor field effect transistor;
  wherein a non-inverting input of the comparator is connected with the second electrode of the second thin film transistor, an inverting input of the comparator is grounded, an output of the comparator is connected with the control electrode of the third thin film transistor; a clock signal receiving terminal of the D flip-flop is connected with the output of the comparator, a data signal input of the D flip-flop is connected with an output of the inverter, a non-inverting signal output of the D flip-flop is connected with an input of the inverter, a control electrode of the first metal oxide semiconductor field effect transistor, and a control electrode of the second metal oxide semiconductor field effect transistor respectively, a second electrode of the first metal oxide semiconductor field effect transistor and a second electrode of the second metal oxide semiconductor field effect transistor are connected with the second control subcircuit, respectively.

7. The compensation circuit according to claim 6, wherein the comparator is a zero-crossing voltage comparator.

8. The compensation circuit according to claim 6, wherein the data flip-flop is a rising edge data flip-flop.

9. A control chip connected with a scanning line in a display panel and is configured to input a scanning signal to the scanning line;
  wherein the compensation circuit is applied to a drive circuit, the drive circuit comprises a first thin film transistor (TFT), a second thin film transistor, an organic light-emitting diode (OLED) and a capacitance; a control electrode of the first thin film transistor is connected with a scanning line, a first electrode of the first thin film transistor is connected with a data line, a second electrode of the first thin film transistor is connected with a control electrode of the second thin film transistor, a second electrode of the second thin film transistor is connected with a positive pole of the organic light-emitting diode, a first electrode of the second thin film transistor is connected with a power terminal, and a negative pole of the organic light-emitting diode is grounded; one end of the capacitance is connected with the second electrode of the first TFT, and the other end of the capacitance is connected with the negative pole of the organic light-emitting diode; wherein the compensation circuit comprises a third thin film transistor and a detection circuit; and
  a control electrode of the third thin film transistor is configured to be connected with the second electrode of the second thin film transistor, a first electrode of the third thin film transistor is configured to be connected with the control electrode of the second thin film transistor, the detection circuit is connected with the second electrode of the third thin film transistor, the scanning line and the data line respectively; and the detection circuit is configured to be turned off and turned on respectively when receiving two continuous voltage signals output from the second electrode of the third thin film transistor.

10. A display device, comprising the control chip according to claim 9.

11. The control chip according to claim 9, wherein the detection circuit comprises a resistor, a T flip-flop, and a fourth TFT;
one end of the resistor is connected with a clock signal receiving terminal of the T flip-flop, the other end of the resistor is connected with the scanning line, a non-inverting signal output of the T flip-flop is connected with a control electrode of the fourth thin film transistor, a second electrode of the fourth thin film transistor is connected with the second electrode of the third thin film transistor, and a first electrode of the fourth thin film transistor is connected with the data line.

12. The control chip according to claim 11, wherein the T flip-flop is a falling edge T flip-flop.

13. The control chip according to claim 9, further comprising a voltage follower connected in series between the third thin film transistor and the detection circuit, wherein a non-inverting input of the voltage follower is connected with the second electrode of the third thin film transistor, and an output of the voltage follower is connected with the detection circuit and an inverting input of the voltage follower, respectively.

14. The control chip according to claim 9, further comprising a first control subcircuit and a second control subcircuit, the first control subcircuit is respectively connected with the second electrode of the second thin film transistor and the second control subcircuit, the first control subcircuit is configured to control the second control subcircuit to output a high-level signal and a low-level signal alternatively according to a signal output by the second electrode of the second thin-film transistor, the second control subcircuit is configured to input the high-level signal and the low-level signal to the scanning line alternatively.

15. The control chip according to claim 14, wherein the first control subcircuit comprises a comparator, a data flip-flop, an inverter, a first metal oxide semiconductor field effect transistor (MOSFET) and a second metal oxide semiconductor field effect transistor;
wherein a non-inverting input of the comparator is connected with the second electrode of the second thin film transistor, an inverting input of the comparator is grounded, an output of the comparator is connected with the control electrode of the third thin film transistor; a clock signal receiving terminal of the D flip-flop is connected with the output of the comparator, a data signal input of the D flip-flop is connected with an output of the inverter, a non-inverting signal output of the D flip-flop is connected with an input of the inverter, a control electrode of the first metal oxide semiconductor field effect transistor, and a control electrode of the second metal oxide semiconductor field effect transistor respectively, a second electrode of the first metal oxide semiconductor field effect transistor and a second electrode of the second metal oxide semiconductor field effect transistor are connected with the second control subcircuit, respectively.

16. The control chip according to claim 15, wherein the comparator is a zero-crossing voltage comparator.

17. The control chip according to claim 15, wherein the data flip-flop is a rising edge data flip-flop.

\* \* \* \* \*